United States Patent
Ichitani et al.

(10) Patent No.: US 11,015,230 B2
(45) Date of Patent: May 25, 2021

(54) WATER-SOLUBLE QUENCHING OIL COMPOSITION

(71) Applicant: IDEMITSU KOSAN CO., LTD., Chiyoda-ku (JP)

(72) Inventors: Katsumi Ichitani, Chiba (JP); Rikki Homma, Yokohama (JP)

(73) Assignee: IDEMITSU KOSAN CO., LTD., Chiyoda-ku (JP)

(*) Notice: Subject to any disclaimer, the term of this patent is extended or adjusted under 35 U.S.C. 154(b) by 175 days.

(21) Appl. No.: 16/088,607

(22) PCT Filed: Mar. 31, 2017

(86) PCT No.: PCT/JP2017/013771
§ 371 (c)(1),
(2) Date: Sep. 26, 2018

(87) PCT Pub. No.: WO2017/171065
PCT Pub. Date: Oct. 5, 2017

(65) Prior Publication Data
US 2019/0100815 A1     Apr. 4, 2019

(30) Foreign Application Priority Data

Mar. 31, 2016   (JP) ............................. JP2016-073504

(51) Int. Cl.
| | | |
|---|---|---|
| *C21D 1/60* | (2006.01) | |
| *C08K 5/09* | (2006.01) | |
| *C10M 173/02* | (2006.01) | |
| *C08L 71/02* | (2006.01) | |
| *C08K 5/06* | (2006.01) | |
| *C08K 5/17* | (2006.01) | |
| *C08J 3/05* | (2006.01) | |
| *C08J 3/07* | (2006.01) | |
| *C10N 20/04* | (2006.01) | |
| *C10N 20/00* | (2006.01) | |
| *C10N 40/24* | (2006.01) | |

(52) U.S. Cl.
CPC .................. *C21D 1/60* (2013.01); *C08J 3/05* (2013.01); *C08J 3/07* (2013.01); *C08K 5/06* (2013.01); *C08K 5/09* (2013.01); *C08K 5/17* (2013.01); *C08L 71/02* (2013.01); *C10M 173/02* (2013.01); *C08J 2371/02* (2013.01); *C10M 2201/102* (2013.01); *C10M 2207/04* (2013.01); *C10M 2207/126* (2013.01); *C10M 2207/127* (2013.01); *C10M 2209/107* (2013.01); *C10M 2215/042* (2013.01); *C10M 2215/223* (2013.01); *C10N 2020/04* (2013.01); *C10N 2020/091* (2020.05); *C10N 2040/24* (2013.01)

(58) Field of Classification Search
CPC ..... C21D 1/56; C21D 1/58; C21D 1/60; C08J 3/07; C08K 5/06; C08K 5/09; C08K 5/17
See application file for complete search history.

(56) References Cited

U.S. PATENT DOCUMENTS

| | | |
|---|---|---|
| 5,766,505 A | 6/1998 | Kanamori et al. |
| 2011/0147645 A1 | 6/2011 | Kawasaki |
| 2013/0001461 A1 | 1/2013 | Ichitani et al. |
| 2017/0175030 A1* | 6/2017 | Jibiki .................. C10M 173/02 |
| 2019/0100815 A1* | 4/2019 | Ichitani ...................... C08J 3/07 |

FOREIGN PATENT DOCUMENTS

| | | |
|---|---|---|
| JP | 4-180515 A | 6/1992 |
| JP | 6-336607 A | 12/1994 |
| JP | 8-231977 A | 9/1996 |
| JP | 9-227932 A | 9/1997 |
| JP | 10-324887 A | 12/1998 |
| JP | 2002-265973 A | 9/2002 |
| JP | 2011-168860 A | 9/2011 |
| JP | 2011-190330 A | 9/2011 |
| JP | 2014-125680 A | 7/2014 |
| JP | 2015-189954 A | 11/2015 |
| TW | 201540825 A | 11/2015 |
| WO | WO 2010/021299 A1 | 2/2010 |

OTHER PUBLICATIONS

English language translation of JP 2011-190330 A (Year: 2011).*
International Search Report dated Jun. 6, 2017 in PCT/JP2017/013771 filed on Mar. 31, 2017.
Combined Chinese Office Action and Search Report dated Feb. 26, 2020, in Patent Application No. 201780020613.3, 25 pages (with unedited computer generated English translation and English Translation of Category of Cited Documents).
Japanese Office Action dated Jun. 30, 2020 in Japanese Patent Application No. 2018-509696 (with unedited computer generated English translation), 7 pages.
Office Action dated Oct. 30, 2020, in Chinese Patent No. 201780020613.3 filed Mar. 31, 2017 (with English translation).

* cited by examiner

*Primary Examiner* — Scott R Kastler
(74) *Attorney, Agent, or Firm* — Oblon, McClelland, Maier & Neustadt, L.L.P.

(57) ABSTRACT

A water-soluble quenching fluid composition prepared by blending: water, at least one kind selected from a polyoxyalkylene glycol and a derivative thereof (A), and at least one kind selected from an alkylene glycol ether (B) and a monocarboxylic acid (C), the polyoxyalkylene glycol or a derivative thereof (A) having a mass average molecular weight of 10,000 or more and 100,000 or less, the alkylene glycol ether (B) having a boiling point of 200° C. or more and a molecular weight per 1 mol of 1,000 g/mol or less.

14 Claims, No Drawings

WATER-SOLUBLE QUENCHING OIL COMPOSITION

FIELD OF INVENTION

The present invention relates to a water-soluble quenching fluid composition.

BACKGROUND ART

In quenching of metals, quenching cracks, quenching distortion, and the like can be prevented by cooling as rapidly as possible in the vapor blanket stage (high-temperature region) (which means a short characteristic number of second), and cooling at a sufficient cooling rate in the temperature range defined in JIS K2242:2012 after breaking the vapor blanket. The quenching fluid composition used in the quenching of metals includes an aqueous composition and an oily composition.

An aqueous quenching fluid is preferably used from the standpoint of the large cooling capability and the less risk of environmental destruction and fire. However, after breaking the vapor blanket, the treated material is rapidly cooled to around 100° C. since the boiling point of water is 100° C. Accordingly, the cooling rate in the temperature range of from 350° C. to 150° C. defined in JIS K2242:2012, Annex A (Method B) becomes short to provide a disadvantage that cracks are liable to occur in the treated material (quenching cracks).

Approaches have been made to avoid the aforementioned disadvantage of the aqueous quenching fluid. PTL 1 describes that the characteristic number of second is shortened by using an aqueous cooling medium having an inorganic salt blended therein.

PTLs 2 and 3 have tried to blend a water-soluble polymer in a water-soluble quenching fluid. PTL 2 describes a copolymer of a polyoxyalkylene derivative and a maleic acid compound as the water-soluble polymer. PTL 3 describes a combination of a polyalkylene glycol or a derivative thereof having a particular molecular weight and a glycol monoether.

CITATION LIST

Patent Literatures

PTL 1: JP 2014-125680 A
PTL 2: JP 4-180515 A
PTL 3: JP 9-227932 A

SUMMARY OF INVENTION

Technical Problem

The aqueous cooling medium of PTL 1 can shorten the characteristic number of second, but provides an insufficient cooling rate in the aforementioned temperature range defined in JIS K2242:2012, Annex A (Method B), and thus is still insufficient in prevention of quenching cracks of the treated material. The composition containing the additive for a water-soluble quenching fluid of PTL 2 provides an appropriate cooling rate, but tends to cause cooling unevenness due to the long characteristic number of second, resulting in a large quenching distortion of the treated material. The water-soluble quenching fluid of PTL 3 has a short characteristic number of second and excellent cooling unevenness resistance characteristics, but tends to cause a compositional change of the water-soluble quenching fluid composition through repeated contact with the treated materials at a high temperature. Accordingly, the good quenching crack preventing effect in the initial stage is difficult to retain in a prolonged period of time.

An object of the present invention is to provide a water-soluble quenching fluid composition that has a sufficiently short characteristic time obtained from a cooling curve obtained based on JIS K2242:2012, Annex A (Method B), has a sufficient cooling rate, and has small changes of the characteristic number of second and the cooling rate after degradation thereof.

Solution to Problem

As a result of earnest investigations made by the present inventors, it has been found that the problem can be solved by a composition having blended as additives therein a polyoxyalkylene glycol or a derivative thereof, and at least one kind selected from a particular alkylene glycol ether and a monocarboxylic acid, and thus the present invention has been completed.

The present invention provides the following items [1] to [3].

[1] A water-soluble quenching fluid composition prepared by blending: water,
at least one kind selected from a polyoxyalkylene glycol and a derivative thereof (A), and
at least one kind selected from an alkylene glycol ether (B) and a monocarboxylic acid (C),
the polyoxyalkylene glycol or a derivative thereof (A) having a mass average molecular weight of 10,000 or more and 100,000 or less,
the alkylene glycol ether (B) having a boiling point of 200° C. or more and a molecular weight per 1 mol of 1,000 g/mol or less.

[2] A concentrated liquid of the water-soluble quenching fluid composition according to the item [1].

[3] A quenching method including: quenching a member containing a metal; and then cooling with the water-soluble quenching fluid composition according to the item [1].

Advantageous Effects of Invention

According to the present invention, a water-soluble quenching fluid composition can be provided that has a sufficiently short characteristic number of second, has a sufficient cooling rate, and has small changes of the characteristic number of second and the cooling rate after degradation thereof.

DESCRIPTION OF EMBODIMENTS

Embodiments of the present invention will be described in detail below.

Water-soluble Quenching Fluid Composition

The water-soluble quenching fluid composition according to the present embodiment is prepared by blending at least one kind selected from the component (A) and at least one kind selected from the component (B) and the component (C).

The aforementioned "water-soluble quenching fluid composition prepared by blending at least one kind selected from the component (A) and at least one kind selected from the component (B) and the component (C)" includes a "composition containing at least one kind selected from the component (A) and at least one kind selected from the component (B) and the component (C) as the new composition". The water-soluble quenching fluid composition may contain other additives in such a range that does not impair the effects of the present invention.

The "characteristic number of second" in the present embodiment means a "characteristic number of second" that is measured according to JIS K2242:2012, Annex A (Method B).

The "cooling rate" in the present embodiment means a cooling rate that is calculated from a cooling time in a temperature range of from 350° C. to 150° C. measured according to JIS K2242:2012, Annex A (Method B).

<Polyoxyalkylene Glycol and Derivative Thereof (A)>

The water-soluble quenching fluid composition of the present embodiment contains blended therein at least one kind selected from a polyoxyalkylene glycol and a derivative thereof (A), and the polyoxyalkylene glycol or a derivative thereof (A) necessarily has a mass average molecular weight of 10,000 or more and 100,000 or less.

The mass average molecular weight that is less than 10,000 is not preferred since it is difficult to provide a water-soluble quenching fluid composition having a sufficient cooling rate. The mass average molecular weight that exceeds 100,000 is not preferred since the viscosity of the composition itself is increased to cause deterioration of the handleability, contamination of the material, carryover of the liquid with the material, and the like. For ensuring a sufficient cooling rate, the mass average molecular weight of the polyoxyalkylene glycol or a derivative thereof (A) is preferably 12,000 or more and 80,000 or less, and more preferably 14,000 or more and 50,000 or less. The mass average molecular weight herein is a polystyrene conversion value by the gel permeation chromatography (GPC) method.

The polyoxyalkylene glycol or a derivative thereof (A) is not particularly limited, as far as it has an oxyalkylene unit as a repeating unit and has a mass average molecular weight in a range of 10,000 or more and 100,000 or less. Preferred examples of the polyoxyalkylene glycol or a derivative thereof (A) include a compound represented by the following general formula (I):

$$R^1O-(R^4O)_n-R^2 \quad (I)$$

In the formula, $R^4$ represents an alkylene group having from 2 to 6 carbon atoms; $R^1$ and $R^2$ each independently represent a hydrogen atom, an alkyl group having from 1 to 10 carbon atoms, an acyl group having from 1 to 11 carbon atoms, or a saturated or unsaturated alicyclic hydrocarbon group or aromatic hydrocarbon group having from 5 to 18 carbon atoms, which may have a substituent; and n represents a number that provides a weight average molecular weight of the compound in a range of 10,000 or more and 100,000 or less. In the case where there are plural units represented by ($R^4O$), i.e., in the case where n≥2, the plural units represented by ($R^4O$) may be the same as or different from each other. In the case where the oxyalkylene units ($R^4O$) are different from each other, the compound is a copolymer, which may be any of a random copolymer and a block copolymer.

The polyoxyalkylene glycol or a derivative thereof (A) is preferably water-soluble.

Preferred examples of the polyoxyalkylene glycol or a derivative thereof (A) include the polyoxyalkylene glycol, in which the ($R^4O$) unit in the formula (1) is constituted by one kind of an alkylene oxide, such as ethylene oxide, propylene oxide, and butylene oxide, the polyoxyalkylene glycol, in which the ($R^4O$) unit in the formula (1) is constituted by two or more kinds of alkylene oxides selected from ethylene oxide, propylene oxide, butylene oxide, and the like, and a derivative of the polyoxyalkylene glycol, in which at least one of the ends of the formula (1), i.e., $R^1$ and $R^2$ represents an alkyl group having from 1 to 10 carbon atoms, an acyl group having from 1 to 11 carbon atoms, or a saturated or unsaturated alicyclic hydrocarbon group or aromatic hydrocarbon group having from 5 to 18 carbon atoms, which may have a substituent.

Examples of the alkyl group having from 1 to 10 carbon atoms represented by $R^1$ and $R^2$ include a methyl group, an ethyl group, a n-propyl group, an isopropyl group, a n-butyl group, an isobutyl group, a sec-butyl group, a tert-butyl group, a hexyl group, a 2-ethylhexyl group, a heptyl group, an octyl group, a nonyl group, and a decyl group. Examples of the acyl group having from 1 to 11 carbon atoms include groups each having the group that is specifically shown as the alkyl group having from 1 to 10 carbon atoms, such as a methyl group and an ethyl group, and a carbonyl group.

Examples of the saturated alicyclic hydrocarbon group having from 5 to 18 carbon atoms represented by $R^1$ and $R^2$ include a cyclopentyl group, a cyclohexyl group, a cycloheptyl group, a cyclooctyl group, a cyclononyl group, and a cyclodecyl group. Examples of the unsaturated alicyclic hydrocarbon group having from 5 to 18 carbon atoms include the aforementioned saturated alicyclic hydrocarbon groups each having at least one unsaturated bond, such as a cyclopentenyl group and a cyclohexenyl group. Examples of the aromatic hydrocarbon group having from 5 to 18 carbon atoms include aryl groups, such as a phenyl group and a naphthyl group.

Examples of the substituent include $C_1$-$C_6$ alkyl groups, $C_1$-$C_6$ alkoxy groups, and $C_6$-$C_{14}$ aryl groups.

Specific examples of the polyoxyalkylene glycol include polyoxyethylene polyoxypropylene glycol.

At least one kind selected from the polyoxyalkylene glycol or a derivative thereof (A) is blended, and two or more kinds thereof may be blended. The amount of at least one kind selected from the polyoxyalkylene glycol or a derivative thereof (A) blended in the water-soluble quenching fluid composition of the present embodiment is preferably 0.1% by mass or more and 30% by mass or less based on the total amount of the composition. The amount thereof blended means the amount of the polyoxyalkylene glycol or a derivative thereof (A) itself, and in the case where plural kinds of the polyoxyalkylene glycol or a derivative thereof (A) are contained, the amount means the total amount thereof. The amount of at least one kind selected from the polyoxyalkylene glycol or a derivative thereof (A) that is in the aforementioned range is preferred since a sufficient cooling rate can be ensured. The amount of at least one kind selected from the polyoxyalkylene glycol or a derivative thereof (A) blended is more preferably 1% by mass or more and 25% by mass or less, and further preferably 2% by mass or more and 20% by mass or less, based on the total amount of the composition.

The water-soluble quenching fluid composition of the present embodiment contains blended therein at least one kind selected from an alkylene glycol ether (B) and a monocarboxylic acid (C). With at least one kind selected from the component (B) and the component (C) blended, the characteristic number of second obtained from the cooling curve of the new composition (initial stage) can be shortened, and a sufficient cooling rate can be provided. Furthermore, the changes of the characteristic number of second and the cooling rate after degradation thereof can be decreased, i.e., durability can be imparted thereto. The components will be described in detail below.

<Alkylene Glycol Ether (B)>

In the present embodiment, the alkylene glycol ether (B) necessarily has a boiling point of 200° C. or more and a molecular weight per 1 mol of 1,000 g/mol or less. The boiling point herein is one under ordinary pressure. When the boiling point of the alkylene glycol ether (B) is less than 200° C., the change of the characteristic number of second between the new composition and the composition after degradation becomes large, resulting in deteriorated durability. Specifically, although excellent initial characteristics can be obtained, there is a tendency that the vapor blanket stage is prolonged through the treatment of the treated materials at a high temperature, and the characteristic number of second is prolonged, resulting in deteriorated durability as a quenching fluid.

The boiling point of the alkylene glycol ether (B) is preferably 205° C. or more, and more preferably 220° C. or more. The boiling point of the alkylene glycol ether (B) is preferably 350° C. or less, and more preferably 300° C. or less.

The molecular weight per 1 mol of the alkylene glycol ether (B) is necessarily 1,000 g/mol or less. When the molecular weight per 1 mol exceeds 1,000 g/mol, the characteristic number of second of the new composition cannot be shortened in some cases.

The molecular weight per 1 mol of the alkylene glycol ether (B) is preferably 75 g/mol or more, more preferably 100 g/mol or more, further preferably 140 g/mol or more, and particularly preferably 160 g/mol or more. The molecular weight per 1 mol of the alkylene glycol ether (B) is preferably 500 g/mol or less, and more preferably 250 g/mol or less.

The alkylene glycol ether (B) is not particularly limited, as far as it has a boiling point of 200° C. or more and a molecular weight per 1 mol of 1,000 g/mol or less. Preferred examples of the alkylene glycol ether (B) include a compound represented by the following general formula (II):

$$R^{11}O\text{---}(R^{B}O)_{m}\text{---}R^{12} \qquad (II)$$

In the formula, $R^{B}$ represents an alkylene group having from 2 to 6 carbon atoms; $R^{11}$ and $R^{12}$ each independently represent a hydrogen atom, an alkyl group having from 1 to 10 carbon atoms, an acyl group having from 1 to 11 carbon atoms, or a saturated or unsaturated alicyclic hydrocarbon group or aromatic hydrocarbon group having from 5 to 18 carbon atoms, which may have a substituent, provided that at least one of $R^{11}$ and $R^{12}$ represents an alkyl group having from 1 to 10 carbon atoms or a saturated or unsaturated alicyclic hydrocarbon group or aromatic hydrocarbon group having from 5 to 18 carbon atoms, which may have a substituent; and m represents a number that provides a molecular weight per 1 mol of the compound in a range of 1,000 g/mol or less. In the case where there are plural units represented by ($R^{B}O$), i.e., in the case where m≥2, the plural units represented by ($R^{B}O$) may be the same as or different from each other. In the case where the oxyalkylene units ($R^{B}O$) are different from each other, the compound is a copolymer, which may be any of a random copolymer and a block copolymer.

Preferred examples of the alkylene glycol ether include the alkylene glycol, in which the ($R^{B}O$) unit in the formula (1) is constituted by one kind of an alkylene oxide, such as ethylene oxide, propylene oxide, and butylene oxide, or two or more kinds of alkylene oxides selected from ethylene oxide, propylene oxide, butylene oxide, and the like, and at least one of the ends of the formula (1), i.e., $R^{11}$ and $R^{12}$ represents an alkyl group having from 1 to 10 carbon atoms. In the examples, an alkylene glycol monoether, in which any one of $R^{11}$ and $R^{12}$ is a hydrogen atom, can be exemplified.

Examples of the alkyl group having from 1 to 10 carbon atoms represented by $R^{11}$ and $R^{12}$ include a methyl group, an ethyl group, a n-propyl group, an isopropyl group, a n-butyl group, an isobutyl group, a sec-butyl group, a tert-butyl group, a hexyl group, a 2-ethylhexyl group, a heptyl group, an octyl group, a nonyl group, and a decyl group. Examples of the acyl group having from 1 to 11 carbon atoms include groups each having the group that is specifically shown as the alkyl group having from 1 to 10 carbon atoms, such as a methyl group and an ethyl group, and a carbonyl group.

Specific examples of the saturated alicyclic hydrocarbon group having from 5 to 18 carbon atoms represented by $R^{11}$ and $R^{12}$ include a cyclopentyl group, a cyclohexyl group, a cycloheptyl group, a cyclooctyl group, a cyclononyl group, and a cyclodecyl group. Examples of the unsaturated alicyclic hydrocarbon group having from 5 to 18 carbon atoms include the aforementioned saturated alicyclic hydrocarbon groups each having at least one unsaturated bond, such as a cyclopentenyl group and a cyclohexenyl group. Examples of the aromatic hydrocarbon group having from 5 to 18 carbon atoms include aryl groups, such as a phenyl group and a naphthyl group.

Examples of the substituent include $C_1$-$C_6$ alkyl groups, $C_1$-$C_6$ alkoxy groups, and $C_6$-$C_{11}$ aryl groups.

The alkylene glycol ether is preferably an alkylene glycol monoalkyl ether having a unit derived from ethylene glycol, propylene glycol, or dipropylene glycol. Examples thereof include an ethylene glycol monoalkyl ether, such as ethylene glycol monohexyl ether, ethylene glycol monooctyl ether, ethylene glycol monodecyl ether, and ethylene glycol monolauryl ether; and an alkylene glycol monoalkyl ether, such as a polyalkylene glycol monoalkyl ether having a propyleneoxy group or a butyleneoxy group instead of the ethyleneoxy group of the aforementioned ethylene glycol monoalkyl ether, e.g., propylene glycol monohexyl ether, dipropylene glycol monopropyl ether, and dipropylene glycol monobutyl ether. The alkylene glycol ether may be used alone or as a combination of two or more kinds thereof.

In the present embodiment, the amount of the alkylene glycol ether (B) blended in the water-soluble quenching fluid composition is preferably 0.1% by mass or more and 10% by mass or less based on the total amount of the composition. When the amount thereof blended is 0.1% by mass or more, the characteristic number of second obtained from the cooling curve can be sufficiently shortened, and a sufficient cooling rate can be provided. Furthermore, the changes of the characteristic number of second and the cooling rate after degradation thereof may be small, resulting in excellent durability. When the amount is 10% by mass or less, the solubility in water can be ensured, in addition to the aforementioned characteristics. The "amount of the alkylene glycol ether (B)" in the case where two or more kinds of the alkylene glycol ethers (B) are used in combination means the total amount thereof.

The amount of the alkylene glycol ether (B) blended is more preferably 0.2% by mass or more and 5% by mass or less, and further preferably 0.4% by mass or more and 3% by mass or less, based on the total amount of the composition.

<Monocarboxylic Acid (C)>

In the present embodiment, the monocarboxylic acid (C) is not particularly limited, and a monocarboxylic acid having a main chain having a number of carbon atoms of 4 or more and 11 or less is preferred. In the present embodiment, the number of carbon atoms of the main chain of the monocarboxylic acid includes the carboxy group-forming carbon atom. In the present embodiment, the main chain is determined according to the IUPAC nomenclature system.

The monocarboxylic acid (C) is preferably at least one kind selected from caproic acid, caprylic acid, nonanoic acid, and 3,5,5-trimethylhexanoic acid, and more preferably 3,5,5-trimethylhexanoic acid. The number of carbon atoms of the main chain of the monocarboxylic acid (C) is more preferably 5 or more and 10 or less, and further preferably 6 or more and 9 or less.

In the present embodiment, the amount of the monocarboxylic acid (C) blended in the water-soluble quenching fluid composition is preferably 0.05% by mass or more and 10% by mass or less based on the total amount of the composition. In the case where the monocarboxylic acid (C) is blended, when the amount thereof blended is 0.05% by mass or more and 10% by mass or less based on the total amount of the composition, the characteristic time obtained form the cooling curve can be sufficiently shortened, and a sufficient cooling rate can be provided. Furthermore, the changes of the characteristic time and the cooling rate after degradation thereof may be small, resulting in excellent durability. In particular, the monocarboxylic acid (C) is further excellent in durability.

The amount of the monocarboxylic acid (C) blended is more preferably 0.1% by mass or more and 8% by mass or less, and further preferably 0.5% by mass or more and 5% by mass or less, based on the total amount of the composition.

The present inventors have found that with the alkylene glycol ether (B) having a boiling point of 200° C. or more and a molecular weight per 1 mol of 1,000 g/mol or less blended, a sufficient cooling rate can be obtained, and the characteristic number of second can be extremely shortened, while suppressing the changes of the characteristic number of second and the cooling rate after degradation thereof. The present inventors have also found that with the monocarboxylic acid (C) blended, a sufficient cooling rate and a short characteristic number of second can be obtained, and excellent suppression of the changes of the characteristic number of second and the cooling rate after degradation thereof can be obtained.

In the present embodiment, the effects of the present embodiment can be obtained by blending any one of the alkylene glycol ether (B) and the monocarboxylic acid (C). The excellent effects can be obtained by using the alkylene glycol ether (B) and the monocarboxylic acid (C) in combination.

<Alkanolamine>

The water-soluble quenching fluid composition of the present embodiment preferably contains blended therein an alkanolamine, in addition to the water and the aforementioned components (A) to (C).

The alkanolamine is not particularly limited, as far as it does not impair the effects of the present embodiment. For example, an alkanolamine having a number of carbon atoms of 1 or more and 12 or less, more preferably 2 or more and 9 or less, may be preferably blended. Specific examples of the alkanolamine include monoethanolamine, diethanolamine, triethanolamine, monomethanol-diethanolamine, monoisopropanolamine, triisopropanolamine, monocyclohexylethanolamine, dicyclohexylethanolamine, mono(2-methylcyclopentyl)ethanolamine, and cyclohexyldiethanolamine.

The amount of the alkanolamine blended is not particularly limited, and is generally 0.1% by mass or more and 10% by mass or less, preferably 0.2% by mass or more and 5% by mass or less, and more preferably 0.4% by mass or more and 4% by mass or less, based on the total amount of the composition.

<Additional Components>

The water-soluble quenching fluid composition of the present embodiment may further contain blended therein additional additives that have been commonly used in a water-soluble quenching fluid, depending on necessity, in such a range that does not impair the object of the present embodiment. As the additional additives, for example, a corrosion inhibitor such as benzotriazole or tolyltriazole, a rust inhibitor, a copper deactivator, an antioxidant, a silicone anti-foaming agent, a colorant, and the like may be appropriately blended. As an aliphatic carboxylic acid other than the monocarboxylic acid (C), an aliphatic dicarboxylic acid may be blended. Examples of the aliphatic dicarboxylic acid include a saturated aliphatic dicarboxylic acid, such as octanedioic acid (suberic acid), nonanedioic acid (azelaic acid), decanedioic acid (sebacic acid), undecanedioic acid, dodecanedioic acid, tridecanedioic acid, tetradecanedioic acid, hexadecanedioic acid, octanedioic acid, eicosanedioic acid, docosanedioic acid, tetracosanedioic acid, hexacosanedioic acid, and octacosanedioic acid (these dicarboxylic acid may be straight-chain or branched).

The content of the additives may be appropriately controlled within a range that does not impair the effects of the present invention. The content of the additives is generally 0.001% by mass or more and 10% by mass or less, preferably 0.005% by mass or more and 8% by mass or less, more preferably 0.01% by mass or more and 5% by mass or less, and further preferably 0.05% by mass or more and 1% by mass or less, based on the total amount (100% by mass) of the lubricating oil composition. In the case where plural components are contained as the additives, the components are independently contained in the aforementioned range.

The total amount of the water, the components (A) to (C), the alkanolamine, and the additional components blended in the water-soluble quenching fluid composition of the present embodiment does not exceed 100% by mass.

<Water>

The water contained in the water-soluble quenching fluid composition of the present embodiment is not particularly limited, and any of distilled water, ion-exchanged water, tap water, industrial water, and the like may be used.

The content of the water in the water-soluble quenching fluid composition of the present embodiment is not particularly limited, and may be selected from a wide range including the balance of the total of the components (A) to (C), the alkanolamine, and the additional components (the total of the components and the water is 100% by mass). The content of the water is generally selected from a wide range of from 50 to 99% by mass, and is preferably from 60 to 98% by mass, and more preferably from 70 to 97% by mass.

In one embodiment of the present invention, the total content of the water and the components (A), (B), and (C) is preferably from 80 to 100% by mass, and more preferably from 95 to 100% by mass, based on the total amount (100% by mass) of the water-soluble quenching fluid composition.

In one embodiment of the present invention, the total content of the water, the components (A), (B), and (C), the alkanolamine, and the additional additives is preferably from 90 to 100% by mass, and more preferably from 95 to 100% by mass, based on the total amount (100% by mass) of the water-soluble quenching fluid composition.

The water-soluble quenching fluid composition of the present embodiment preferably has a characteristic number of second in a cooling curve obtained from the cooling property test defined in JIS K2242:2012, Annex A (Method B) of 4 seconds or less, more preferably less than 4 seconds, and further preferably 3 seconds or less. The water-soluble quenching fluid composition of the present embodiment can have a sufficient cooling rate around 300 seconds after breaking the vapor blanket.

The water-soluble quenching fluid composition of the present embodiment is also excellent in durability. For example, the changes between the characteristic number of second and the cooling rate as the new composition and the characteristic number of second and the cooling rate after degradation thereof can be decreased.

According to the present embodiment, a concentrated liquid obtained by concentrating the water-soluble quenching fluid composition is also provided. The concentrated liquid is preferred in expediency of storage and transportation.

The concentrated liquid in the present embodiment is preferably obtained by concentrating the water-soluble quenching fluid composition by 2 times or more and 30 times or less, more preferably 2.5 times or more and 25 times or less, and further preferably 3 times or more and 20 times or less.

Next, a method of quenching according to the present invention is explained below.

<Quenching Method and Use>

The present embodiment also provides a quenching method including: quenching a member containing a metal; and then cooling with the water-soluble quenching fluid composition. The aforementioned water-soluble quenching fluid composition has a sufficiently short characteristic number of second, has a sufficient cooling rate, and has small changes of the characteristic number of second and the cooling rate after degradation thereof, and therefore the quenching method of the present embodiment is preferred since quenching cracks and quenching distortion of the metal member treated can be significantly suppressed.

The present embodiment also provides use of the water-soluble quenching fluid composition on cooling a member containing a metal after quenching.

The quenching method of the present embodiment may be soaking quenching, high-frequency quenching, and the like.

EXAMPLES

The present embodiment will be described more specifically with reference to examples below, but the present embodiment is not limited thereto.

Examples 1 to 4 and Comparative Examples 1 to 4

Water-soluble quenching fluid compositions were prepared according to the blended materials and the formulations shown in Table 1.

The water-soluble quenching fluid compositions each were evaluated for the cooling capability and the durability by the following evaluation methods. The results are shown in Table 1.

Evaluation Methods (1) Evaluation of Cooling Property

A cooling curve was obtained for each of the water-soluble quenching fluid compositions at a liquid temperature 40° C. according to the cooling property test defined in JIS K2242:2012, Annex A (Method B).

(1.1) Characteristic Number of Second

The period of time (characteristic number of second) until reaching the characteristic temperature (i.e., the temperature, at which the vapor blanket stage ended) was obtained from the cooling curve.

(1.2) Cooling Rate

The cooling rate in the temperature range of from 350° C. to 150° C. was calculated in the cooling curve.

(2) Durability Test (Induction Heating Degradation Test)

The evaluation of the cooling property of the item (1) was performed, and the results were designated as the result before the induction heating degradation test. The induction heating degradation test was then performed under the following condition. After the degradation test, the evaluation of the cooling property of the item (1) was again performed, and the results were designated as the result after the induction heating degradation test.

Test Condition

Test piece: SUS304 (25 mm in diameter×50 mm)
Quenching temperature: 850° C. (25 kHz induction heating)
Liquid amount: 400 mL
Liquid temperature: 40° C.
Agitation: 200 rpm
Nitrogen blowing: 200 mL/min
Quenching time: 5 minutes
Number of times of quenching: 100

TABLE 1

|  |  |  |  | Example | | | | Comparative Example | | | |
| --- | --- | --- | --- | --- | --- | --- | --- | --- | --- | --- | --- |
|  |  | Boiling point | Unit | 1 | 2 | 3 | 4 | 1 | 2 | 3 | 4 |
| Polyoxyalkylene glycol (A) | Polyoxyethylene polyoxypropylene glycol |  | wt % | 3.1 | 3.1 | 3.1 | 3.1 | 3.1 | 3.1 | 3.1 | 3.1 |
| Alkylene glycol ether (B) | Dipropylene glycol monobutyl ether | 231 | wt % | 1 |  | 1 |  |  |  |  |  |
|  | Ethylene glycol monohexyl ether | 208 | wt % |  | 0.5 | 0.5 |  |  |  |  |  |
| Alkylene glycol ether | Propylene glycol monobutyl ether | 170 | wt % |  |  |  |  |  |  | 0.5 | 1 |
| Monocarboxylic acid (C) | 3,5,5-trimethylhexanoic acid |  | wt % |  | 1 | 1 | 1 |  |  |  |  |
| Alkanolamine | Monoisopropanolamine |  | wt % | 0.4 |  |  |  |  |  | 0.4 |  |
|  | Cyclohexyldiethanolamine |  | wt % |  | 2.4 | 2.4 | 2.4 |  | 2.4 |  |  |
| Additional component | Decanedioic acid |  | wt % |  |  |  |  |  |  |  | 0.2 |
|  | Dodecanedioic acid |  | wt % | 0.1 | 0.1 | 0.1 | 0.1 |  | 0.1 | 0.1 |  |
|  | Benzotriazole |  | wt % | 0.1 | 0.1 | 0.1 | 0.1 |  | 0.1 | 0.1 |  |

TABLE 1-continued

|  |  |  | Unit | Example 1 | Example 2 | Example 3 | Example 4 | Comparative Example 1 | Comparative Example 2 | Comparative Example 3 | Comparative Example 4 |
|---|---|---|---|---|---|---|---|---|---|---|---|
|  |  | Potassium hydroxide | wt % |  |  |  |  |  |  |  | 0.1 |
|  |  | N-(2-hydroxyethyl)piperazine | wt % |  |  |  |  |  |  |  | 0.4 |
| Water |  | Ion-exchanged water | wt % | 95.3 | 92.8 | 91.8 | 93.3 | 96.9 | 94.3 | 95.8 | 95.2 |
| Total |  |  | wt % | 100 | 100 | 100 | 100 | 100 | 100 | 100 | 100 |
| Cooling property | Characteristic number of second | Before degradation | sec | 2.8 | 2.8 | 2.9 | 3.7 | 7.4 | 8.5 | 3.9 | 2.8 |
|  |  | After degradation | sec | 3.3 | 4.8 | 3.8 | 4.4 | — | — | 6.8 | 10.6 |
|  | Cooling rate from 350° C. to 150° C. | Before degradation | ° C./sec | 266 | 199 | 256 | 220 | 342 | 275 | 263 | 168 |
|  |  | After degradation | ° C./sec | 298 | 236 | 278 | 233 | — | — | 275 | 289 |
|  | Change amount | Characteristic number of second | sec | 0.5 | 2.0 | 0.9 | 0.7 | — | — | 2.9 | 7.8 |
|  |  | Cooling rate | ° C./sec | 32 | 37 | 22 | 13 | — | — | 12 | 121 |
|  | Change rate (%) *1 | Characteristic number of second |  | 18 | 71 | 31 | 19 | — | — | 74 | 279 |
|  |  | Cooling rate |  | 12 | 19 | 9 | 6 | — | — | 5 | 72 |

*1: change rate = (((value after degradation)/(value before degradation)) − 1) × 100

The blended materials in Tables 1 and 2 are as follows.
(A) Polyoxyalkylene glycol or derivative thereof
Polyoxyethylene polyoxypropylene glycol (mass average molecular weight: 15,000, degree of polydispersion (Mw/Mn): 1.5, ethylene oxide/propylene oxide: 72/28)
(B) Alkylene glycol ether
Dipropylene glycol monobutyl ether (boiling point: 231° C., molecular weight per 1 mol: 190.3 g/mol)
Ethylene glycol monohexyl ether (boiling point: 208° C., molecular weight per 1 mol: 146.3 g/mol)
(Additional alkylene glycol ether)
Propylene glycol monobutyl ether (boiling point: 170° C., molecular weight per 1 mol: 132.2 g/mol)
(C) Monocarboxylic acid
3,5,5-trimethylhexanoic acid (number of carbon atoms of longest straight-chain moiety except for carbon forming carboxy group: 5)
<Alkanolamine>
Monoisopropanolamine
Cyclohexyldiethanolamine
<Water>
Ion-exchanged water
<Additional components>
Decanedioic acid, dodecanedioic acid, benzotriazole, potassium hydroxide, N-(2-hydroxyethyl)piperazine It is understood that the water-soluble quenching fluid compositions of Examples have a sufficiently short characteristic number of second, have a sufficient cooling rate, and are excellent in cooling capability. The changes of the characteristic number of second and the cooling rate after degradation thereof are small, resulting in excellent durability. It is understood from Example 1 that with the component (B) contained, a short characteristic number of second can be obtained while retaining the sufficient cooling rate. It is understood from Example 4 that with the component (C) contained, the change rates between before and after degradation thereof are small, resulting in excellent durability. In Comparative Examples 3 and 4 containing an alkylene glycol ether having a boiling point of less than 200° C., the characteristic number of second is in an allowable range in the initial stage, but the change rate of the characteristic number of second after degradation thereof is large.

INDUSTRIAL APPLICABILITY

According to the present embodiment, a water-soluble quenching fluid composition that has a sufficiently short characteristic number of second, has a sufficient cooling rate, and has small changes of the characteristic number of second and the cooling rate after degradation thereof, and a quenching method using the water-soluble quenching fluid composition on cooling can be provided.

The invention claimed is:

1. A water-soluble quenching fluid composition prepared by blending:
   water,
   at least one member selected from the group consisting of a polyoxyalkylene glycol and a derivative thereof (A), and
   at least one member selected from the group consisting of an alkylene glycol ether (B) and a monocarboxylic acid (C),
   wherein:
   the polyoxyalkylene glycol or a derivative thereof (A) has a mass average molecular weight of more than 10,000 and 100,000 or less;
   the alkylene glycol ether (B) has a boiling point of 220° C. or more and a molecular weight of 1,000 g/mol or less, and
   the monocarboxylic acid (C) is only one member selected from the group consisting of caproic acid, caprylic acid, nonanoic acid and 3,5,5-trimethylhexanoic acid.

2. The water-soluble quenching fluid composition according to claim 1, wherein the alkylene glycol ether (B) is blended in the blending.

3. The water-soluble quenching fluid composition according to claim 1, wherein the monocarboxylic acid (C) is blended in the blending and has a main chain having a number of carbon atoms of 4 or more and 11 or less.

4. The water-soluble quenching fluid composition according to claim 1, wherein the alkylene glycol ether (B) is blended in the blending in an amount of 0.1% by mass or more and 10% by mass or less based on a total amount of the water-soluble quenching fluid composition.

5. The water-soluble quenching fluid composition according to claim 1, wherein the monocarboxylic acid (C) is blended in the blending in an amount of 0.05% by mass or more and 10% by mass or less based on a total amount of the water-soluble quenching fluid composition.

6. The water-soluble quenching fluid composition according to claim 1, wherein the at least one member selected from the group consisting of the polyoxyalkylene glycol and a derivative thereof (A) is blended in an amount of 0.1% by mass or more and 30% by mass or less based on a total amount of the water-soluble quenching fluid composition.

7. The water-soluble quenching fluid composition according to claim 1, further comprising an alkanolamine blended in an amount of 0.1% by mass or more and 10% by mass or less based on a total amount of the water-soluble quenching fluid composition.

8. A concentrated liquid, obtained by concentrating the water-soluble quenching fluid composition according to claim 1.

9. A quenching method, comprising:
quenching a member containing a metal; and then
cooling the member with the water-soluble quenching fluid composition according to claim 1.

10. The water-soluble quenching fluid composition according to claim 1, wherein a content of the water is 91.8% by mass or more and 99% by mass or less based on a total amount of the water-soluble quenching fluid composition.

11. The water-soluble quenching fluid composition according to claim 1, which has a characteristic number of second in a cooling curve obtained from the cooling property test defined in JIS K2242-2012, Annex A (Method B) of 4 seconds or less, and a sufficient cooling rate of about 300 seconds after breaking the vapor blanket.

12. The water-soluble quenching fluid composition according to claim 1, wherein the at least one member selected from the group consisting of the alkylene glycol ether (B) and the monocarboxylic acid (C) is the monocarboxylic acid (C).

13. The water-soluble quenching fluid composition according to claim 1, wherein the at least one member selected from the group consisting of the alkylene glycol ether (B) and the monocarboxylic acid (C) is the alkylene glycol ether (B).

14. The water-soluble quenching fluid composition according to claim 1, wherein the at least one member selected from the group consisting of the alkylene glycol ether (B) and the monocarboxylic acid (C) is the alkylene glycol ether (B) and the monocarboxylic acid (C).

* * * * *